US011212120B2

(12) United States Patent
Davis et al.

(10) Patent No.: US 11,212,120 B2
(45) Date of Patent: Dec. 28, 2021

(54) OPTICAL KEY PROTECTED AUTHENTICATION AND ENCRYPTION

(71) Applicants: SCHOTT AG, Mainz (DE); UNIVERSITEIT TWENTE, Enschede (NL)

(72) Inventors: Mark J. Davis, Clarks Summit, PA (US); Martin Letz, Mainz (DE); Allard Mosk, Enschede (NL); Pepijn Pinkse, Enschede (NL)

(73) Assignee: SCHOTT AG, Mainz (DE)

( * ) Notice: Subject to any disclaimer, the term of this patent is extended or adjusted under 35 U.S.C. 154(b) by 334 days.

(21) Appl. No.: 16/206,344

(22) Filed: Nov. 30, 2018

(65) Prior Publication Data
US 2019/0109719 A1  Apr. 11, 2019

Related U.S. Application Data

(63) Continuation of application No. PCT/EP2017/060878, filed on May 8, 2017.

(30) Foreign Application Priority Data

May 31, 2016 (EP) ..................................... 16172091

(51) Int. Cl.
*H04L 29/06* (2006.01)
*H04L 9/32* (2006.01)
(Continued)

(52) U.S. Cl.
CPC .............. *H04L 9/3278* (2013.01); *G09C 5/00* (2013.01); *H04L 9/0852* (2013.01);
(Continued)

(58) Field of Classification Search
CPC ... H04L 9/3278; H04L 9/0869; H04L 9/0852; G09C 5/00
See application file for complete search history.

(56) References Cited

U.S. PATENT DOCUMENTS 8,819,423 B2 *  8/2014  Ekkizogloy ............ H04B 10/40
                                                        713/168
9,729,317 B2 *  8/2017  Pikus .................... H04L 9/0866
(Continued)

FOREIGN PATENT DOCUMENTS

| CN | 101006477 | 7/2007 |
|---|---|---|
| CN | 101820343 | 9/2010 |

(Continued)

OTHER PUBLICATIONS

Shoukry et al., "PyCRA: Physical Challenge-Response Authentication for Active Sensors Under Spoofing Attacks", CCS'15: Proceedings of the 22nd ACM SIGSAC Conference on Computer and Communications Security, Oct. 2015, pp. 1004-1015 (Year: 2015).*
(Continued)

*Primary Examiner* — Morshed Mehedi
(74) *Attorney, Agent, or Firm* — Ohlandt. Greeley, Ruggiero & Perle. L.L.P.

(57) ABSTRACT

An apparatus for authenticating an optical key and an apparatus for generating a random number from an optical key are provided. The optical key is used for reliable authenticatability and the random number is stable when or after the optical key is exposed to an external influence such as, but not limited to, a physical or chemical stimulus including a different ambient condition, a mechanical stress, or chemical contact.

16 Claims, 7 Drawing Sheets

(51) Int. Cl.
  *H04L 9/08* (2006.01)
  *G09C 5/00* (2006.01)
  *G06F 7/58* (2006.01)
(52) U.S. Cl.
  CPC ............ *H04L 9/0869* (2013.01); *G06F 7/588* (2013.01); *H04L 2209/12* (2013.01)

(56) References Cited

U.S. PATENT DOCUMENTS

| | | | |
|---|---|---|---|
| 2008/0121708 | A1 | 5/2008 | Rhoads |
| 2009/0153841 | A1 | 6/2009 | Ophey |
| 2010/0213878 | A1 | 8/2010 | Silverbrook |
| 2012/0036905 | A1* | 2/2012 | Grayson ............... G02B 5/0825 70/237 |
| 2013/0148976 | A1* | 6/2013 | Patel ...................... G02B 6/36 398/116 |
| 2013/0243187 | A1 | 9/2013 | Horstmeyer |
| 2017/0103595 | A1* | 4/2017 | Taylor ................ G07C 9/00182 |

FOREIGN PATENT DOCUMENTS

| | | |
|---|---|---|
| CN | 105404916 | 3/2016 |
| EP | 2230794 | 9/2010 |
| EP | 2693685 | 2/2014 |
| WO | 2007046018 | 4/2007 |

OTHER PUBLICATIONS

International Search Report and Written Opinion dated Jul. 12, 2017 from corresponding International Application No. PCT/EP2017/060878, 14 pages.

Goorden, et al., "Quantum-secure authentication with a Classical Key", Optica 1.000421, Mar. 1, 2013, retrieved from the Internet: URL:http://arxiv.org/abs/1303.0142, 8 pages.

Horstmeyer, et al., "Physical key-protected one-time pad", Scientific Reports, vol. 3, No. 1, Dec. 1, 2013, pp. 1-6.

Skoric, et al., "Security of Quantum-Readouts PUFS against quadrature based challenge estimation attacks", International Association for Cryptologic Research, vol. 20130304:202043, Mar. 4, 2013, pp. 1-11.

International Preliminary Report on Patentability dated Dec. 4, 2018 from corresponding International Application No. PCT/EP2017/060878, 10 pages.

Pappu, "Physical One-Way Functions", Science, vol. 297, pp. 2026-2030, Sep. 20, 2002.

Mosk, "Controlling waves in space and time for imaging and focusing in complex media", Nature Photonics, vol. 6, pp. 283-292, May 2012.

Buchanan, "Forgery: Fingerprinting documents and packaging", Nature, vol. 436, p. 475, Jul. 2005.

* cited by examiner

FIG. 5A
FIG. 5B
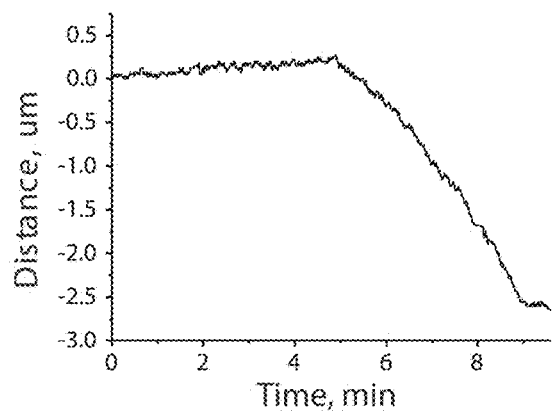
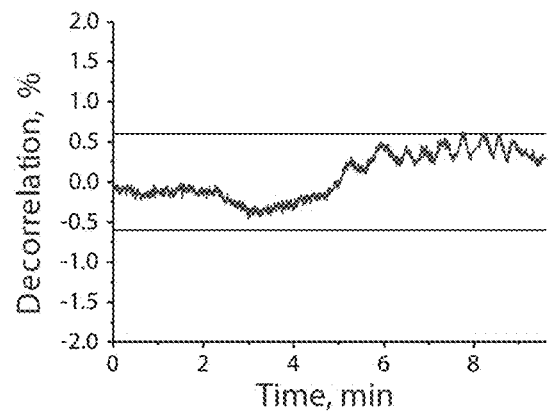
FIG. 6
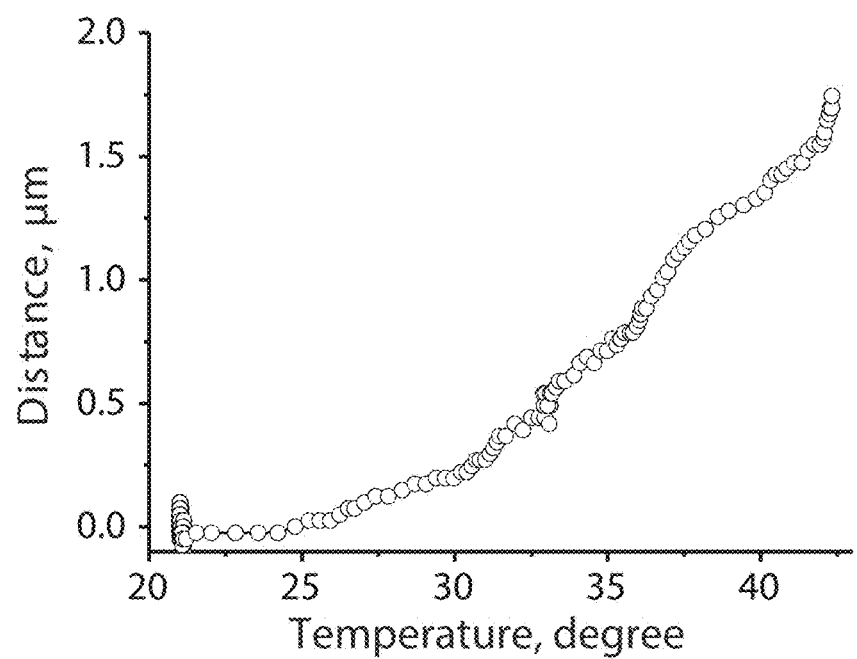

FIG. 7A             FIG. 7B
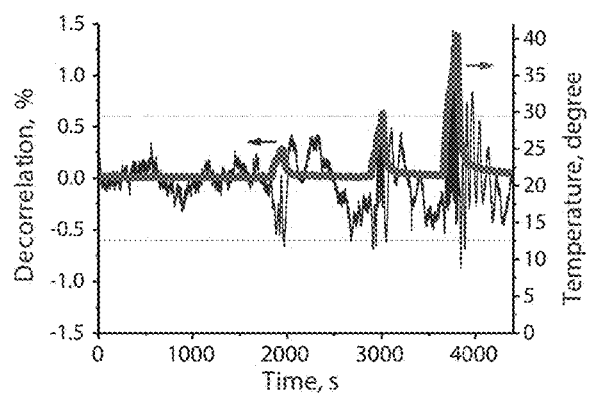 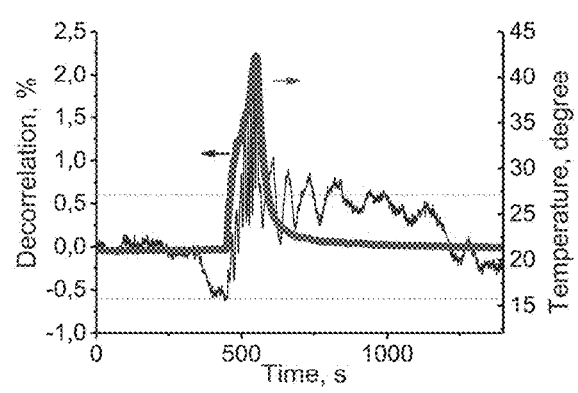
FIG. 8
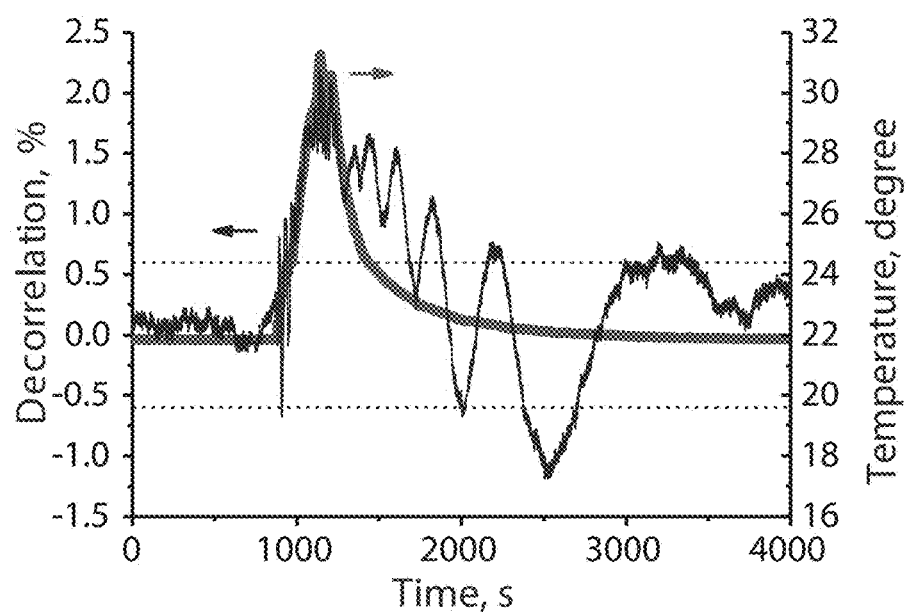

| Equation | y = A + B*x | | |
|---|---|---|---|
| Adj. R-Squa | 0.98397 | | |
| | | Value | Standard Err |
| O1 | A | 22.3398 | 0.00374 |
| O1 | B | 0.34893 | 0.00222 | ately, the radiation may strike on the challenge forming
OPTICAL KEY PROTECTED AUTHENTICATION AND ENCRYPTION

CROSS REFERENCE TO RELATED APPLICATIONS

This application is a continuation of International Application PCT/EP2017/060878 filed May 8, 2017, which claims benefit under 35 USC § 119 of European Application 16172091.7 filed May 31, 2016, the entire contents of both of which are incorporated herein by reference.

BACKGROUND

1. Field of the Invention

The invention relates to the field of authentication and encryption using optical keys.

2. Description of Related Art

Secure authentication as well as encryption is gaining increasing importance for communication and exchange of confidential information. Authentication and encryption are closely linked technologies, whereat both of which can benefit in terms of security when using physical keys instead of digital keys. A physical key is a physical object characterized by a unique structure, typically of microscopic scale, which originates from random influences during the process of manufacture. Thus, a physical key is practically impossible to replicate. The microscopic random signature of the physical key—or the physical key itself—is often referred to as a physical unclonable function (PUF). Often, the microscopic random signature can be utilized by optical methods, that is, the physical key is an optical (physical) key.

The EP 2 693 685 A1 provides a quantum secure device, system and method for verifying challenge-response pairs using a physical unclonable function (PUF).

The US 2013/0243187 A1 discloses a device, including one or more communication physical unclonable function (CPUF) and key storage devices.

The WO 2007/046018 A1 discloses a device for creating challenge-response pairs with an integrated physical unclonable function (PUF) with combined sensor and display.

The US 2008/0121708 A1 describes an identity credential or card comprising a substrate conveying information related to an individual, and further comprising a phase-changing medium that serves to very a directional albedo function.

Further scientific references in this field are the following:

J. Buchanan, R. Cowburn, A. Jausovec, D. Petit, P. Seem, G. Xiong, D. K. Fenton, D. Allwood, and M. Bryan, Forgery: Fingerprinting documents and packaging, Nature 436, 475 (2005).

S. A. Goorden, M. Horstmann, A. P. Mosk, B. Škorić, and P. W. H. Pinkse, Quantum-secure authentication of a physical unclonable function Optica 1, 421 (2014).

A. P. Mosk A. Lagendijk, G. Lerosey, and M. Fink, Controlling waves in space and time for imaging and focusing in complex media, Nat. Photon. 6, 283 (2012).

R. Pappu, B. Recht, J. Taylor, and N. Gershenfeld, Physical One-Way Functions, Science 297, 2026 (2002).

R. Horstmeyer, B. Judkewitz, I. M. Vellekoop, S. Assawaworrarit, and C Yang, Physical key-protected one-time pad, Sci. Rep. 3, 3543 (2013).

A typical setup for the authentication of an optical key comprises a light source for irradiating the optical key in order to exploit its unique signature. The same applies for common setups for the generation of random numbers from an optical key, which can be used for encryption. Since the PUF of the optical key is usually exploited by illumination, suitable materials for producing optical keys are strongly scattering materials. Moreover, strongly scattering objects are suited particularly since the speckle pattern, which is obtained by illuminating the strongly scattering object, contains a combination of coherent and incoherent scattering contributions such that slight microscopic changes in the scattering medium have dramatic consequences for the speckle pattern.

However, practical applications suffer from the problem that the speckle pattern also depends in a highly sensitive manner on a variety of parameters of the setup comprising the optical key. This dependence on slight changes within the setup, which may even be hard to control, hinders a reliable operation of the devices under non-laboratory conditions and especially in everyday use.

SUMMARY

An object of the invention is to enhance the reliability of setups comprising an optical key and to improve their robustness, particularly for non-laboratory conditions.

An aspect of the object of the invention is to enhance the practical reliability of the authentication of an optical key, particularly for quantum secure authentication.

Another aspect of the object of the invention is to enhance the practical reliability of random number generation from an optical key, particularly for encryption or one-time pad encryption.

The object of the invention is solved by the present application.

The invention provides an apparatus for authenticating an optical key by verifying a match of a challenge-response pair.

The apparatus comprises a challenge forming device for forming a challenge.

The challenge formed by the challenge forming device may, in particular, be a spatially modulated light wave. That is, the challenge forming device may be designed as a spatial light modulator (SLM) or may comprise a SLM. The challenge forming device may be adjustable such that the challenge forming device can adopt one of a plurality of settings. For example, the SLM may comprise an adjustable array to impose one of a plurality of spatially varying modulations on the light beam.

The apparatus may further comprise a preferably coherent radiation source to irradiate the challenge forming device. In particular, the apparatus may comprise a radiation source, for emitting radiation comprising quanta. The radiation source may preferably be an electromagnetic radiation source for emitting electromagnetic radiation comprising photons. The radiation may strike on the challenge forming device to introduce for example spatial modulations into the radiation in order to form a (radiation) challenge. In other words, the challenge forming device may be irradiatable by the radiation source and the challenge forming device may in particular be adapted for forming the challenge when being irradiated by radiation emitted by the radiation source.

Further, the apparatus comprises an optical key, which is receptive to the challenge formed by the challenge forming device, for providing a response to the challenge when receiving the challenge formed by the challenge forming device. The optical key comprises a scattering material, in particular a strongly scattering medium. The scattering material may be an inorganic scattering material. In other words, the optical key may provide a nano- or microstructure which determines the response of the optical key to a challenge. The nano- or microstructure preferably is arranged in a volumetric manner (3D), although it shall not be excluded that the structure may be arranged in a planar manner, for example on a surface (2D). The optical key and/or the nano- or microstructure may be denoted as physical unclonable function (PUF).

Further, the apparatus comprises a response verifying device, which is receptive to the response provided by the optical key, for verifying if the response provided by the optical key matches the challenge formed by the challenge forming device.

The response verifying device may, for example, comprise a SLM. The response verifying device may in particular be adjustable in a similar way as the challenge forming device, whereat each setting of the response verifying device may match one setting of the challenge forming device. In other words, the response verifying device may adapt one specific of a plurality of settings. The specifically selected setting of the response verifying device may preferably be related to the selected setting of the challenge forming device. In other words, each setting of the plurality of settings of challenge forming device may be related to exactly one setting of the plurality of settings of challenge forming device.

Regarding the aforementioned apparatus comprising the challenge forming device, the response verifying device as well as the optical key, it was found that the reliability of the authentication of the optical key can already be significantly improved when optimizing aspects regarding the optical key itself, although the optical key, once produced, has actually no user-changeable parameters as opposed to the other components of the authentication apparatus.

Thus, according to the invention, the optical key is characterized by a reliable authenticatability when or after being exposed to an external influence, in particular to a physical or chemical stimulus such as a different ambient condition, mechanical stress or chemical contact. This has the advantage that a temporary or prevailing exposure of the optical key to external influences does not change the response of the optical key to a given challenge.

In an embodiment of the apparatus for authenticating an optical key, the optical key is characterized by authenticatability at more than one temperature, preferably at a continuous temperature range, in particular when receiving the challenge formed by the challenge forming device. This has the advantage that the optical key can be used in a wide temperature range, which is essential for practical applications.

In an embodiment of the apparatus for authenticating an optical key, the optical key is characterized by authenticatability after common use such as exposure to touching, clothing or weather. This allows for example that the optical key can be removed from the apparatus in order to be transported or securely stored at a place different from the apparatus. Moreover, this allows the key to be authenticated in different authentication apparatuses of the same type.

In an embodiment of the apparatus for authenticating an optical key, the optical key is characterized by a thermal reliability parameter which is lower than 1/(200,000 Kelvin), preferably lower than 1/(500,000 Kelvin), more preferably lower than 1/(1,000,000 Kelvin), whereat the thermal reliability parameter is the absolute value of one or more summed up temperature coefficients of the optical key, in particular the temperature coefficient of the optical path length $(1/S)(dS/dT)$, where S is the optical path length within the material of the optical key.

The one or more summed up temperature coefficients may for example be selected from the group consisting of the temperature coefficient of a length of the optical key, the temperature coefficient of an area of the optical key, the temperature coefficient of a volume of the optical key and the temperature coefficient of a refractive index of the optical key.

In other words, the thermal reliability parameter may be defined as the decorrelation speed of the speckle pattern with temperature, in particular the temperature coefficient of the optical path length $(1/S)(dS/dT)$ or its absolute value. The thermal reliability parameter may in particular be positive.

In an embodiment of the apparatus for authenticating an optical key, the optical key comprises at least two different materials and the thermal reliability parameter of each material is lower than 1/(100,000 Kelvin), preferably lower than 1/(200,000 Kelvin), more preferably lower than 1/(500,000 Kelvin).

In an embodiment of the apparatus for authenticating an optical key, the optical key comprises a ceramic material, in particular a glass ceramic material. The ceramic material may be a ceramic scattering material preferably with a thermal reliability parameter as indicated above. The glass ceramic material may be for example ZERODUR® K20 or cordierite glass ceramic. Preferably, the optical key comprises or consists of a glass ceramic, in particular a athermal glass ceramic, with at least two different phases, wherein at least one of the phases, for example a crystalline phase, defines a structure which determines the response of the optical key when receiving the challenge formed by the challenge forming device. The phase determining the response may be a physical unclonable function. As glass ceramic, a LAS-system containing lithium-, silicon-, and aluminum-oxides, may be preferred.

In an embodiment of the apparatus for authenticating an optical key, the optical key contains cordierite, silimanit, cristobalite, Mg—B quartz, mullit and/or eucryptite. The material of the optical key may in particular be a ceramic scattering material containing cordierite, silimanit, cristobalite, Mg—B quartz, mullit and/or eucryptite as crystalline phases, in particular as a physical unclonable function.

The optical key may also contain $AB_2O_8$ where A is selected from the group of elements consisting of {Zr, Hf, Zn, Ti, U, TH, Lu} or a mixture of these elements and B is selected from the group of elements consisting of {W, Mo} or mixtures of these elements The optical key may also contain $CD_2O_7$ where C is selected from the group of elements consisting of {Zr, Hf, Zn, Ti, U, TH, Lu, Pu, Np, W, Ce, Sn, Ge, Si} or a mixture of these elements and D is selected from the group of elements consisting of {V,P} or mixtures of these elements The optical key may also contain $E_2F_3O_{12}$ where E is selected from the group of elements consisting of {Sc, Y, Lu, Al, Ga, La, "Lanthanoids"} or a mixture of these elements and F is selected from the group of elements consisting of {W, Mo, P}.

The optical key may also contain $GH_3$ where G is selected from the group of elements consisting of {Sc, Y, Ba, Mg, Ca, Sr} and H is selected from the group of elements consisting of {F, Cl} or mixtures of these elements including other aliovalent substitutions.

The optical key may in particular comprise crystalline phases which combine negative thermal expansion with high refractive index.

In an embodiment of the apparatus for authenticating an optical key, the optical key comprises a material with a tuned scattering property, in particular with a tuned scattering length, preferably of at least 1 and at most 10 micrometer, whereat the material with the tuned scattering property is in particular produced by a method for tuning the scattering property in the manufacture.

In a preferred embodiment of the apparatus for authenticating an optical key, the optical key comprises a physical unclonable function, in particular such that manufacturing a replica of the optical key is practically unfeasible. The PUF can for example comprise the microscopic arrangement of the crystallites of a ceramic material.

For practical applications, the reliability of the apparatus comprising the challenge forming device, the response verifying device and the optical key can be further improved by adding special auxiliary equipment to the setup, as described below.

The apparatus for authenticating an optical key may preferably comprise a fixture for temporal fixation of the optical key, in particular when receiving the challenge formed by the challenge forming device. This allows for a precise positioning an orientation of the optical key and may also provide an option for removing the optical key from the apparatus and reinserting the optical key at the exact same position and orientation.

The apparatus for authenticating an optical key may further preferably comprise an interpolation device for interpolating between multiple responses of the optical key, in particular obtained at different temperatures for providing an extended authenticatability of the optical key, in particular at an enlarged temperature range. The interpolating device may for example comprise and/or carry out an algorithm to interpolate between the scattering signatures at different temperatures in order to enlarge the temperature range within which a given scatterer can be authenticated.

The interpolation device and/or the algorithm may also be coupled to the fixation of the key in order to adjust the position and/or orientation of the key. That is, the interpolation device may be designed such as to reposition and/or reorient the optical key. The interpolation device and/or the algorithm may for example also be coupled to a cooling or heating device in order to change the temperature of the optical key, in particular to a value within a predefined temperature range.

In an embodiment of the apparatus for authenticating an optical key, the number of quanta, e.g., photons, in the challenge formed by the challenge forming device is less than the least possible number of parameters required to unambiguously characterize each setting of the plurality of settings of the challenge forming device. In this case, the authentication may be referred to as quantum secure authentication (QSA). The advantage is that, due to quantum mechanical principles, an adversary can no longer determine the quantum state of the challenge in order to generate the matching response. In other words, the authentication is unconditionally secure.

The invention further relates to an optical key for an apparatus for optical key authentication, in particular for authentication such as quantum secure authentication.

The invention further relates to a method for authenticating an optical key by verifying a match of a challenge-response pair.

The method for authenticating an optical key comprises a step of forming a challenge by means of a challenge forming device.

The method for authenticating an optical key further comprises a step of providing a response to the challenge by means of an optical key, which is receptive to the challenge formed by the challenge forming device, when receiving the challenge formed by the challenge forming device, whereat the optical key is characterized by a reliable authenticatability when or after being exposed to an external influence, in particular to a physical or chemical stimulus such as a different ambient condition, mechanical stress or chemical contact.

The method for authenticating an optical key further comprises a step of verifying if the response provided by the optical key matches the challenge formed by the challenge forming device by means of a response verifying device, which is receptive to the response provided by the optical key.

The invention further relates to an apparatus for generating a random number from an optical key.

The apparatus for generating a random number comprises a preferably coherent radiation source for emitting electromagnetic radiation, in particular light.

The apparatus for generating a random number may optionally comprise a spatial light modulator, which is irradiatable by the radiation emitted by the radiation source, for forming spatially modulated radiation when being irradiated by radiation emitted by the radiation source.

The apparatus for generating a random number further comprises an optical key, which is irradiatable by the spatially modulated radiation formed by the spatial light modulator or by the radiation emitted by the radiation source, for forming spatially modulated scattered radiation when being irradiated by the spatially modulated radiation formed by the spatial light modulator or by the radiation emitted by the radiation source.

The apparatus for generating a random number further comprises a detector, which is irradiatable by the spatially modulated scattered radiation formed by the optical key, for providing signals associated to the spatially modulated scattered radiation when being irradiated by the spatially modulated scattered radiation.

The apparatus for generating a random number further comprises a random number generating device for generating random numbers when receiving the signals provided by the detector, whereat the random number is stable when or after the optical key is exposed to an external influence, in particular a physical or chemical stimulus such as a different ambient condition, mechanical stress or chemical contact.

In an embodiment of the apparatus for generating a random number, the random number is stable for more than one temperature, preferably for a continuous temperature range, in particular when the optical key is irradiated by the spatially modulated radiation formed by the spatial light modulator. This has the advantage that the optical key can be used in a wide temperature range, which is essential for practical applications.

In an embodiment of the apparatus for generating a random number, the random number is stable after common use of the optical key such as exposure to touching, clothing or weather. This allows for example that the optical key can be removed from the apparatus in order to be transported or securely stored at a place different from the apparatus. Moreover, this allows the key to be used in different apparatuses for generating a random number.

In an embodiment of the apparatus for generating a random number, the optical key is characterized by a thermal reliability parameter, in particular as defined above.

In an embodiment of the apparatus for generating a random number, the optical key comprises a scattering material, in particular as mentioned above, or a ceramic material, for example as indicated above, or a material containing cordierite, silimanit, cristobalite, Mg—B quartz, mullit and/or eucryptite such as described above.

In an embodiment of the apparatus for generating a random number, the optical key comprises a material with a tuned scattering property, in particular as outlined above.

In an embodiment of the apparatus for generating a random number, the optical key comprises a physical unclonable function, in particular as noted above.

The apparatus for generating a random number may preferably comprise a fixture for temporal fixation of the optical key, in particular when being irradiated by the spatially modulated radiation formed by the spatial light modulator. This allows for a precise positioning an orientation of the optical key and may also provide an option for removing the optical key from the apparatus and reinserting the optical key at the exact same position and orientation.

The apparatus for generating a random number may further preferably comprise an interpolation device for interpolating between spatially modulated scattered radiation from the optical key obtained at different conditions, in particular at different temperatures, for providing a stable random number, in particular for an enlarged temperature range. The interpolating device may for example comprise and/or carry out an algorithm to interpolate between the scattering signatures of the optical key at different temperatures in order to enlarge the temperature range within which a given scatterer can be used to generate random numbers.

The interpolation device and/or the algorithm may also be coupled to the fixation of the key in order to adjust the position and/or orientation of the key, in particular as described above. The interpolation device and/or the algorithm may also be coupled to a cooling or heating device in order to change the temperature of the optical key, in particular as mentioned above.

The invention further relates to an optical key for an apparatus for generating a random number, in particular for encryption such as one-time pad encryption.

The invention further relates to a method for generating a random number from an optical key.

The method for generating a random number comprises a step of emitting electromagnetic radiation, in particular light, by means of a radiation source.

The method for generating a random number further comprises a step of forming spatially modulated scattered radiation by means of an optical key, which is irradiatable by the radiation emitted by the radiation source, when being irradiated by radiation emitted by the radiation source, whereat the random number is stable when or after the optical key is exposed to an external influence, in particular a physical or chemical stimulus such as a different ambient condition, mechanical stress or chemical contact.

The method for generating a random number further comprises a step of providing signals associated to the spatially modulated scattered radiation by means of a detector, which is irradiatable by the spatially modulated scattered radiation formed by the optical key, when being irradiated by the spatially modulated scattered radiation.

The method for generating a random number further comprises a step of generating random numbers by means of a random number generating device, when receiving the signals provided by the detector.

The invention further relates to using a material with a thermal reliability parameter which is lower than 1/(200,000 Kelvin), preferably lower than 1/(500,000 Kelvin), more preferably lower than 1/(1,000,000 Kelvin), and/or a material as indicated above as an optical key and/or as a physical unclonable function, in particular for authentication such as quantum secure authentication and/or encryption such as one-time pad encryption.

DESCRIPTION OF THE DRAWINGS

The invention is explained below in light of examples and drawings, wherein:

FIG. 5A shows the displacement of the sample in axial direction by using stage with piezo controller FIG. 5B shows decorrelation of speckle pattern from ceramic glass sample measured during displacement with the constant temperature, FIG. 6 shows axial shift of the sample position during heating from 21 degrees to 43 degrees, FIG. 7A shows the time dependence of decorrelation of speckle pattern (thin line) and temperature (thick line) for ceramic glass ZERODUR® K20 from a first measurement, FIG. 7B shows the time dependence of decorrelation of speckle pattern (thin line) and temperature (thick line) for ceramic glass ZERODUR® K20 from a second measurement on the same sample as FIG. 7A, FIG. 8 shows the time dependence of decorrelation of speckle pattern (thin line) and temperature (thick line) for LZS ceramic glass.

DETAILED DESCRIPTION

Figure 1:
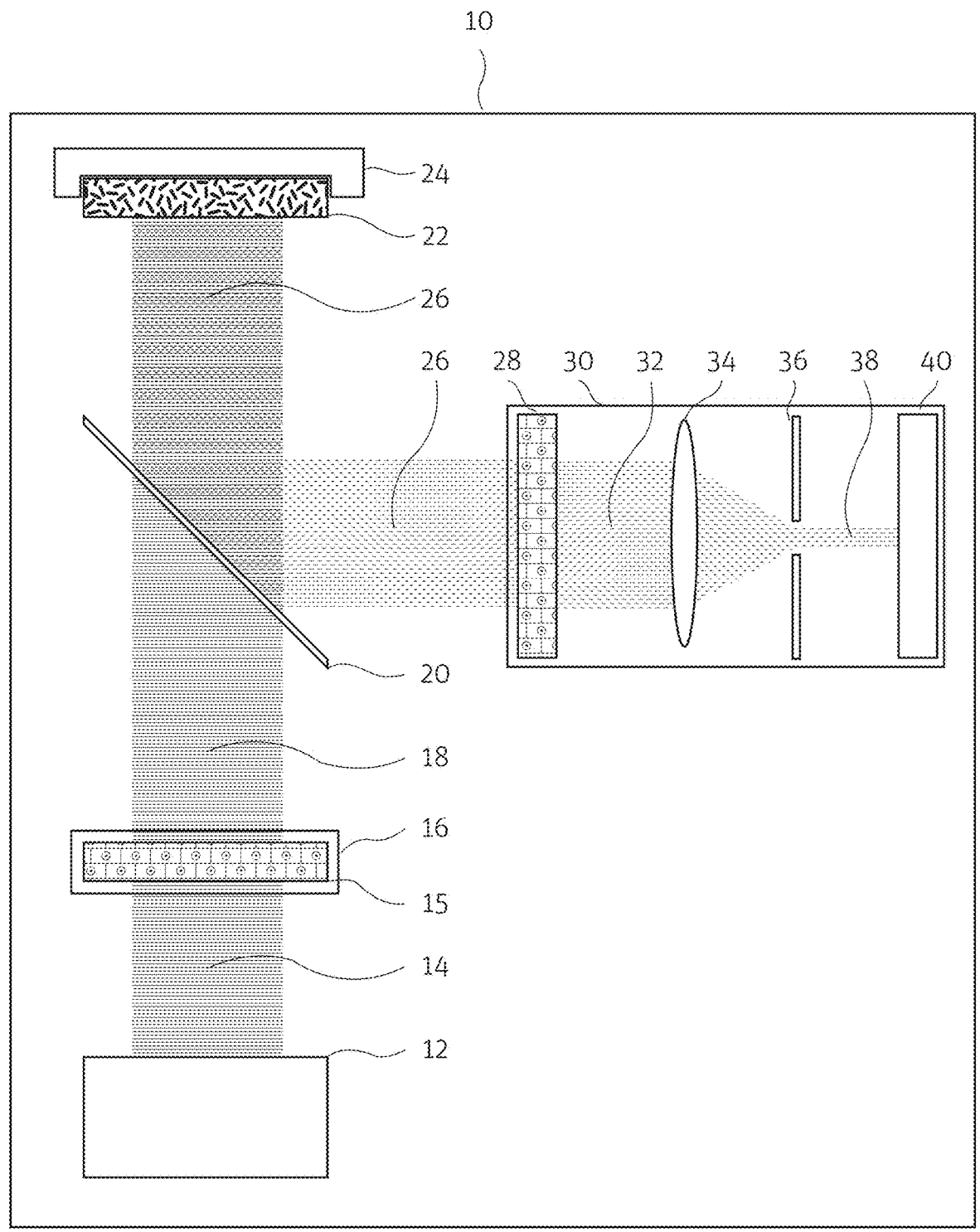
FIG. 1 is a schematic drawing of an apparatus for authenticating an optical key.

Referring to FIG. 1, the optical key authentication apparatus 10 comprises a laser 12 for emitting coherent light 14, which strikes on a SLM 15 of a challenge forming device 16. The SLM 15 introduces challenge information, e.g., from a challenge-response pair database to which the challenge forming device 16 may be coupled, into the light beam 14. Thus the challenge forming device forms a challenge 18, which passes through a beam splitter 20 and strikes on an optical key 22, which is firmly mounted in a fixation 24.

The optical key 22, comprised in the apparatus 10, provides a response 26 to the challenge 18, which is reflected back onto the beam splitter 20 and coupled out onto a SLM 28 of a response verifying device 30. The SLM 28, which is adjusted to a setting which belongs to the setting of the SLM 15 of the challenge forming device 16, introduces response information, e.g., from the aforementioned challenge-response pair database, into the response 26 in order to cancel the spatial modulations, provided the optical key 22 acts as expected. In other words, the SLM 28 is set to a setting, which revokes the spatial modulations of the response of the optical key 22 to the given challenge 18 formed by the SLM 15.

The light pulse 32 can now be focused, e.g., by a lens 34 through a pinhole plane 36 onto a detector 40. The detector 40 of the response verifying device 30 may, e.g., count the number of photons in the incident light pulse 38. If the spatial modulations have been revoked successfully, i.e., if the optical key is correct, the detector 40 counts more photons than in the case where the optical key is incorrect. In the latter case, the spatial modulations of the response cannot be cancelled out such that focusing the light pulse 32 fails.

Figure 2:
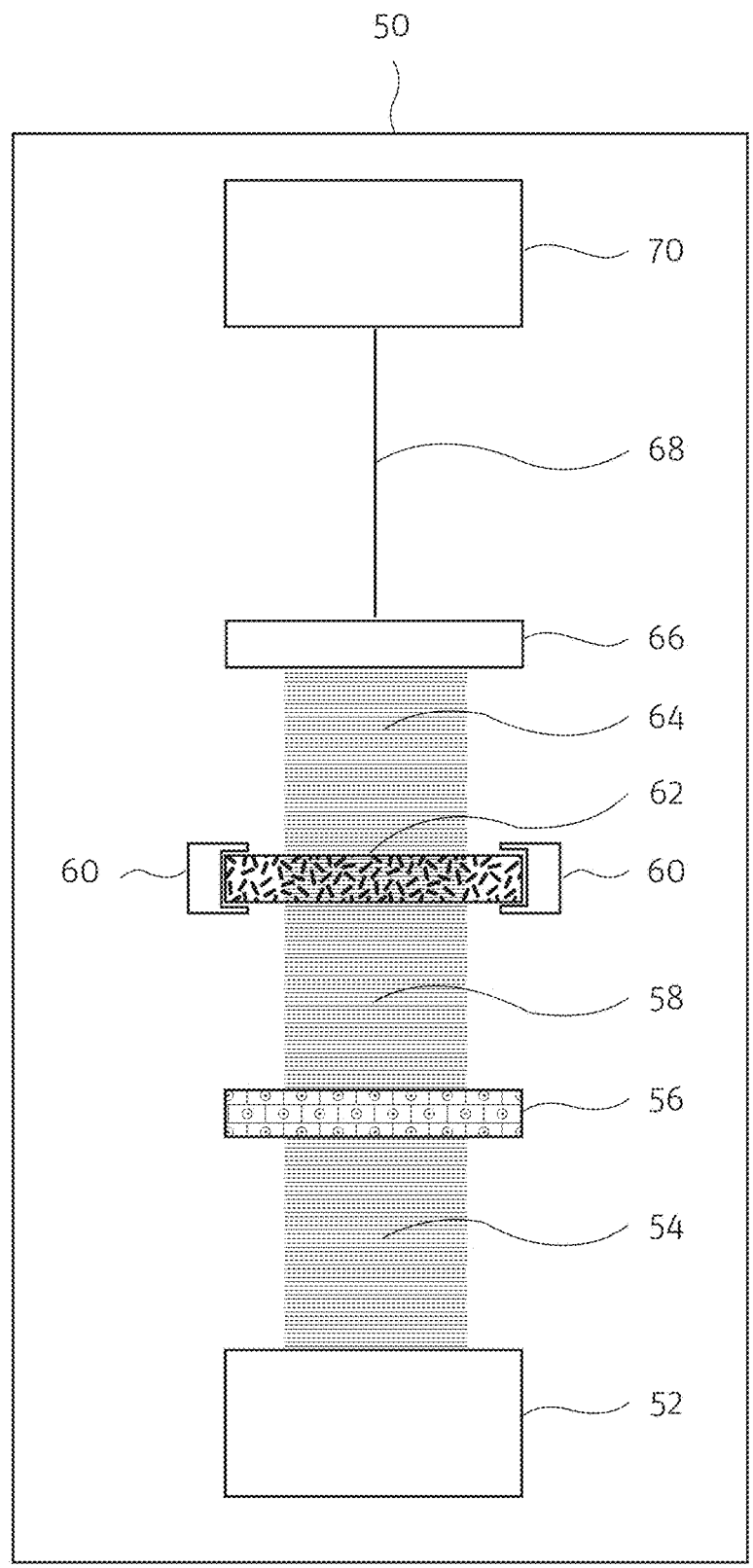
FIG. 2 is a schematic drawing of an apparatus for generating a random number.

Referring to FIG. 2, the optical key random number generation device 50 also comprises a coherent light source 54 for emitting coherent light 54 passing through a spatial light modulator 56 leading to spatially modulated light 58. The spatially modulated light 58 hits on an optical key 62, which is fixed to a key mount 60, leading to spatially modulated scattered light 64. The spatially modulated scattered light 64 strikes on a detector 66, which detects the speckle pattern of the spatially modulated scattered light 64. Based on the speckle pattern on the detector plane, the detector 66 provides electric signals through a link 68 to a random number generator 70.

The introduction of spatial modulations using the spatial light modulator 56 acquires its meaning, when implementing a one-time pad encryption, where for example two optical keys are used, cf. e.g., US 2013/0243187 A1.

While the optical key 22 in the example of FIG. 1 operates in reflection mode, the optical key 62 in the example of FIG. 2 works in passage mode. However, this may also be configured vice versa, respectively.

Referring to FIGS. 1 and 2, the optical keys 22, 62 are manufactured from a strongly scattering media. The strongly scattering medium comprises random scatterers and thus has a unique scattering signature, when illuminated. The speckle pattern of the illuminated strongly scattering object contains a combination of coherent and incoherent scattering contributions, so that slight changes in the scattering medium have dramatic consequences for the speckle pattern. This attribute, together with the fact that copying of optical fields becomes impossible in the low photon number limit, makes strongly scattering media an ideal and robust key for secure encryption.

Moreover, the optical keys 22, 62 are volumetric scatterers. Optical keys consisting of three-dimensional media are much more secure than keys made out of two-dimensional materials such as paper.

Figure 3:
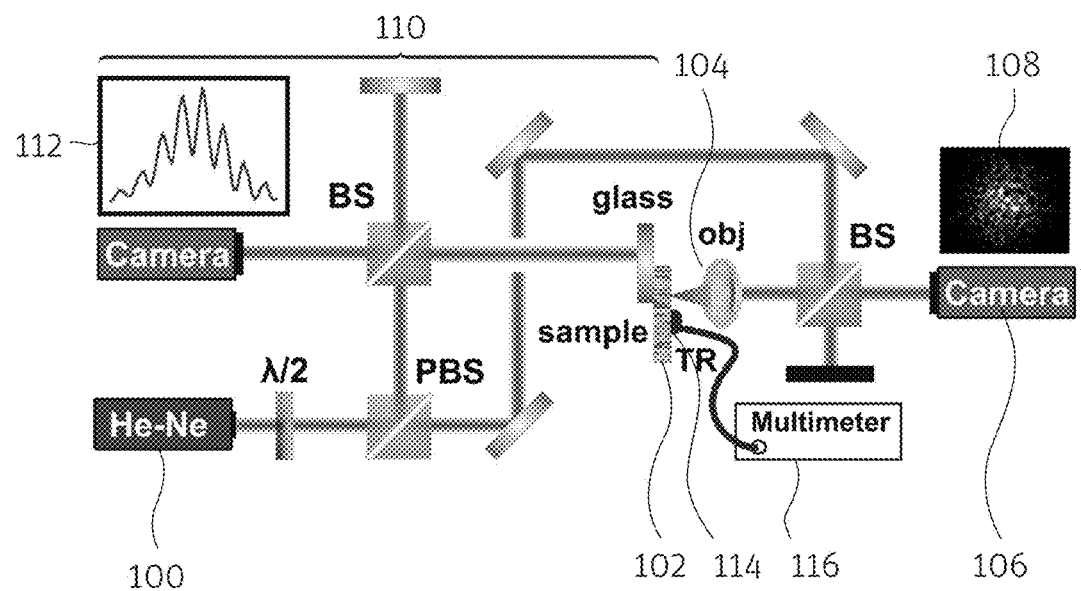
FIG. 3 shows a diagram of an experimental setup for testing properties of speckle patterns.

Referring to FIG. 3, an experimental setup for testing properties of speckle patterns is illustrated. Beam splitters are denoted as BS, a polarizing beam splitter as PBS, a thermoresistor as TR, an objective as obj and a half-wave plate as λ/2.

The setup has been used to experimentally test speckle patterns of different glass and ceramic based scattering materials in the wide temperature range. In what follows, it is detailed that it could be shown that special ceramic samples are stable (less than 1% decorrelation) within a temperature range from 20 to 30° C.

Continuous wave output of He—Ne laser 100 with a wavelength of 633 nm is employed to produce speckle picture from different scattering samples. Laser radiation is focused to the sample 102 with microscope objective 104 (10×, NA=0.25). Scattering light is collected in backward direction with the help of the same objective 104. Standard CCD camera 106 from Allient is used to visualize speckle pattern 108. Heating is performed by using an external heater which is brought close to the sample (approximately 1 cm distance).

A Michelson interferometer 110 is used for measuring displacement of the sample in axial direction with resolution better than 100 nm. A typical interference pattern 112 is sketched in left part of the illustration. Temperature control is performed by measuring changes in resistivity of pt100 resistance temperature detector 114 attached to the surface of the sample with thermo conductive glue. Accuracy of the Multimeter 116 allows to measure temperature with high resolution. Experiments were made on different samples: ground glass diffusers and ceramic glasses.

Figure 4A:
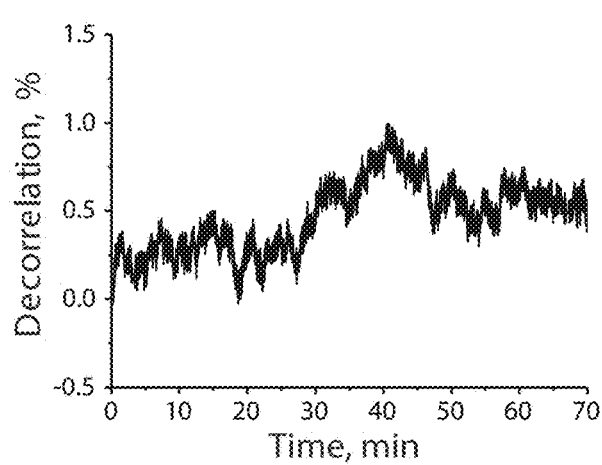
FIG. 4A shows the decorrelation of speckle pattern from ceramic glass sample during 70 minutes of continuous measurements

In a control series of experiments (calibration measurements), long-term variations in the speckle pictures without additional heating have been quantified. Decorrelation (D) as a function of time was calculated with the following formula:

$$D(t) = \left(1 - \frac{\Sigma R_{t,0}}{\Sigma R_{0,0}}\right)100\%$$

Where $R_{t_1,t_2}$—cross correlation between images obtained at the moment $t_1$ and $t_2$. Changes in correlations of speckle patterns during more than 1 hour of measurements are presented at the FIG. 4A. Average decorrelation during 1 hour was 0.5% with the standard deviation of 0.2%. It is seen that all data points are within the range of 1.2%.

Figure 4B:
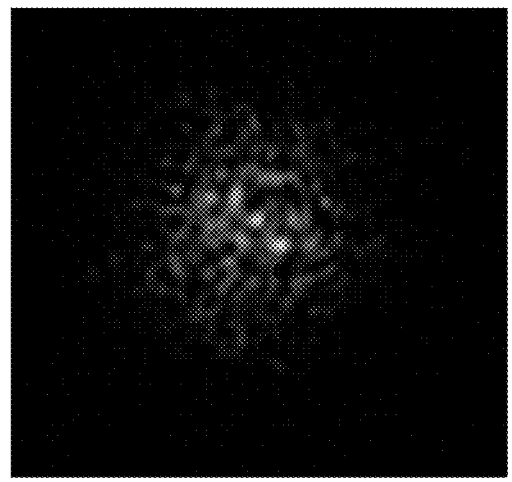
FIG. 4B shows a typical image of speckle pattern of ceramic glass.

Temperature measured with the help of thermistor during the same time was 21.15±0.04°. Laser power was stable within 0.2%. Position of sample was stable within 0.1 μm. Typical image of speckle pattern of ceramic glass is presented in FIG. 4B.

An influence of small sample displacement on the speckle pattern decorrelation was also measured. The sample was displaced in controllable way with the 3D Piezo stage in axial direction in the range from 0 to 2.75 μm and simultaneously measured changes in position with the help of Michelson interferometer, as shown in FIG. 5A. Temperature was constant. So these measurements can be compared with decorrelation of speckle pattern. The result is presented on the FIG. 5B, wherein the experimental decorrelation data and an area of 1.2% (horizontal lines) are shown. It is seen that despite of the movements of the sample decorrelation still lie within an estimated error area of 1.2%.

From minute 5 to 9 in FIG. 5B it is also seen that the displacement of the sample giving rise to small oscillations which, however, also do not lead to large changes in absolute value of decorrelation.

Furthermore, the displacement of the sample during the heating from 21° to 43° was checked. Such temperature changes cause shift in position of the sample less than 2 μm as can be seen from FIG. 6. This displacement, as was shown in the previous measurements (FIGS. 5A and 5B), causes no noticeable changes in decorrelation leading only to oscillations near the mean value. Thus, all changes in decorrelation above an error value are due to internal changes in the sample.

The results of the calibration measurements, as discussed so far, were presented for ceramic glass sample. It is noted that the character of such data was the same for all kind of samples.

In what follows, results of measurements are presented for ZERODUR® K20 (as first sample), a LZS-1/6C glass ceramic (as second sample) and a ground glass (as third sample).

As a first sample, ZERODUR® K20 glass ceramic has been used. This sample contains keatite solid-solution crystals: $LiAlSi_2O_6$, some amount of Zn and P additions (2 µm size) and less than 5 wt % of $ZrTiO_4$ crystals (5 nm size). Any residual glass preferably is quite low in content, but would be enriched in $Al_2O_3$ and $SiO_2$.

FIGS. 7A and 7B show results of simultaneous measurements of decorrelation of speckle pattern (thin line) and temperature (thick line) for ZERODUR® K20 ceramic glass. FIG. 7A and FIG. 7B present data from two different experiments on the same sample. Horizontal lines show an error area of ±0.6% estimated in previous calibration measurements.

As can be seen, the significant changes in decorrelation appear only when the temperature increases more than 10 degrees. Heating by 20 degrees leads to changes only in 1.6%. Well resolved oscillations occur due to small shifting of the sample as have been shown before in FIG. 5B.

As a second sample, a LZS glass-ceramic (LZS-1/6C) is used. The sample comprises nearly 40 wt % residual glass, the main crystal phases are a complex Li—Zn-silicate phase (37 wt %) of imprecise stoichiometry along with a considerable amount of cristobalite (nearly pure $SiO_2$) at about 25 wt %.

Simultaneous measurements of decorrelation of speckle pattern (thin line) and temperature (thick line) for LZS ceramic glass are presented in FIG. 8. Horizontal lines show an error area of ±0.6% estimated in previous measurements. In this case, heating by 10 degrees leads to changes in approximately 2%. Well resolved oscillations occur due to small axial shifting of the sample as have been shown before.

As a third sample, a standard glass diffuser is used.

Figure 9A:
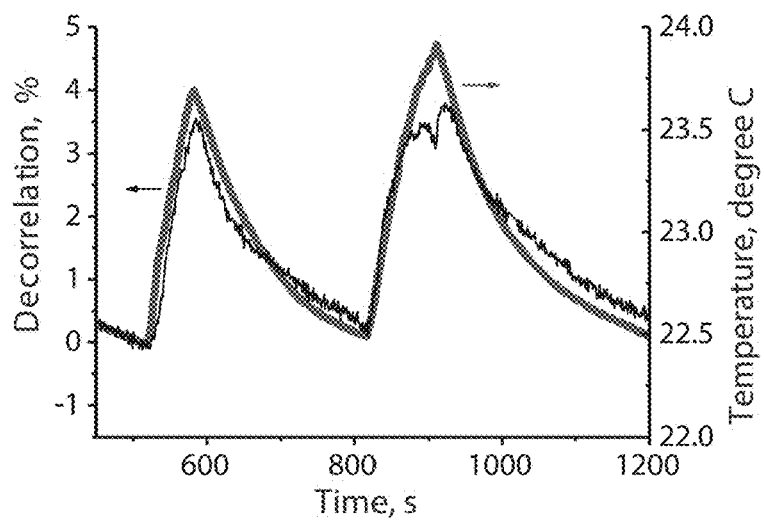
FIG. 9A shows the time dependence of decorrelation of speckle pattern (thin line) and temperature (thick line) for standard ground glass diffuser.
Figure 9B:
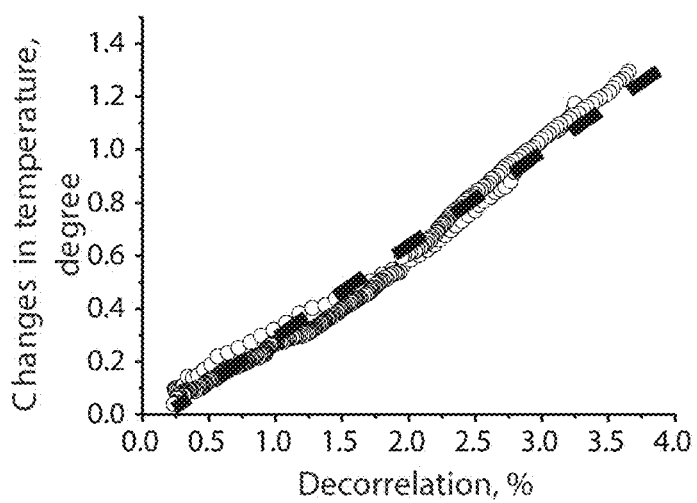
FIG. 9B shows changes in temperature in degrees as a function of decorrelation (in percent), wherein dots are experimental values and the dashed line is a line approximation with parameters as indicated in the table below.

Measurements of decorrelation of speckle pattern (thin line) and temperature (thick line) for standard ground glass diffuser are presented in FIG. 9A. It is seen that the ground glass diffuser is more sensitive to temperature changes. Temperature changes by less than half degree induce significant increase percent of decorrelation. Changes in temperature in degrees as a function of decorrelation (in percent) are presented in FIG. 9B, wherein dots are experimental values and the dashed line is a line approximation with parameters as indicated in the table below FIG. 9B.

Figure 10:
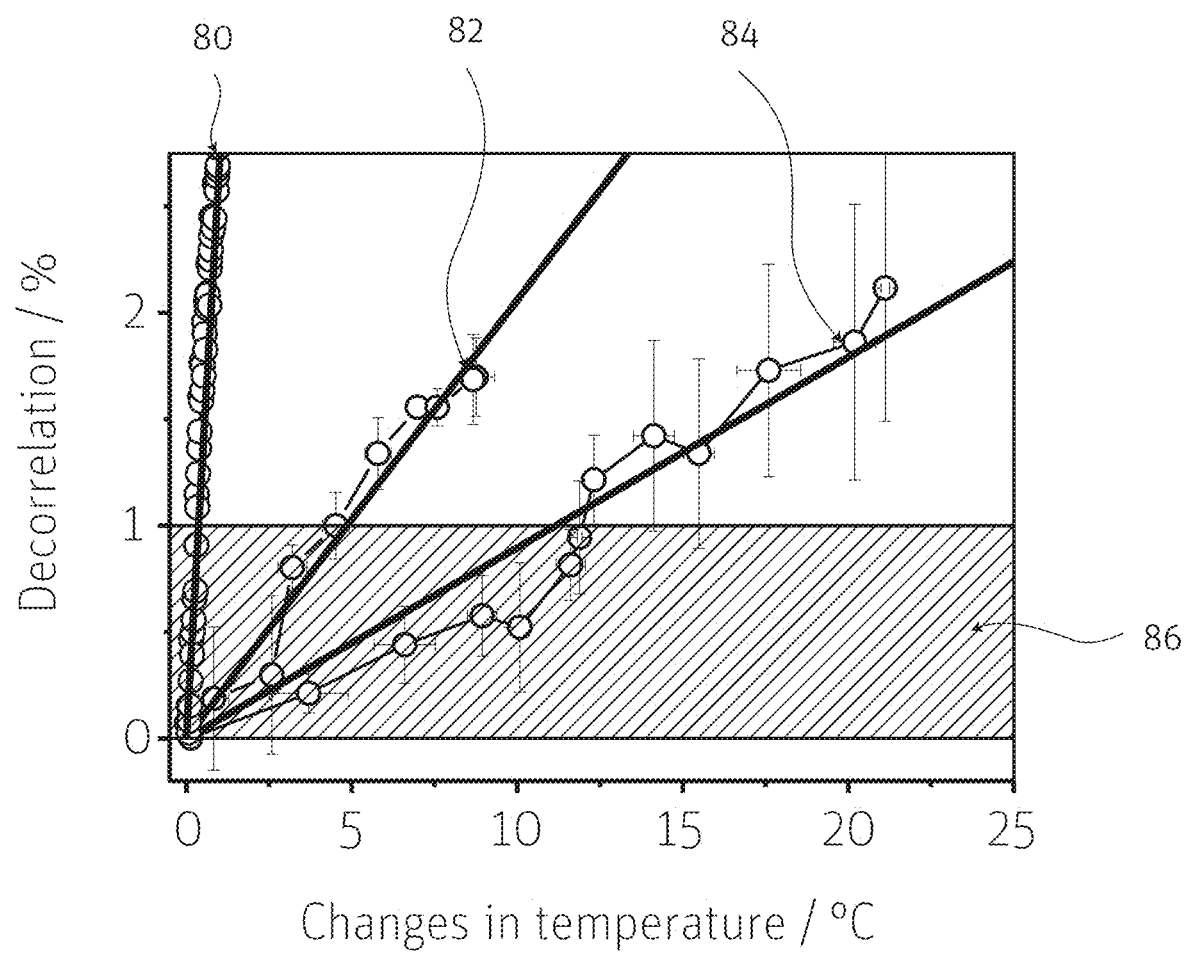
FIG. 10 shows the decorrelation of a speckle pattern as a function of temperature for three different materials used for an optical key.

Referring to FIG. 10 the temperature dependence of the speckle pattern provided by optical keys manufactured from different scattering media as outlined before is shown. The data is extracted from data presented in FIGS. 7-9 and normalized to zero on the temperature scale and also to zero on the decorrelation scale for comparison. The dashed area 86 represents a long-term errors area estimated in the calibration measurement shown in FIG. 4A. Solid lines are linear approximations of the experimental data ($D=\alpha\Delta T$, where D are changes in decorrelation in units (non percent), $\Delta T$ are changes in temperature in degrees and α is the linear thermal expansion coefficient in $K^{-1}$).

The scattering signature 80 corresponds to an optical key made from ground glass. As can be seen, already a slight temperature change of a few degrees leads to a dramatic decorrelation of the speckle pattern.

In fact, it has been found that most scattering materials show a speckle pattern which strongly changes with temperature. It has been found that the reason for this is that in most materials thermal expansion is present in addition to a change of the refractive index n as a function of temperature. In other words both, the linear thermal expansion coefficient $$\alpha = \frac{1}{L}\frac{dL}{dt}$$

as well as the thermo-optic coefficient $$\tau_n = \frac{1}{n}\frac{dn}{dT}$$

is non-negligible.

In most scattering materials, even a few degrees change in temperature lead to a complete decorrelation of the scattering signature and the properties of a scattering key are lost. This problem has been experimentally verified, e.g., by using $TiO_2$ paste on glass as a scattering medium or by using strongly scattering polymers, and thus constitutes a real technical issue.

In order to solve this problem, the optical key 22, 62 is preferably manufactured from a material with a near-athermal scattering signature. In other words, the PUF is built to be applicable in a wide temperature range.

Referring to FIG. 10, two glass ceramic systems have been used and compared to the scattering signature 80 of ground glass ($\alpha=27\times10^{-6}$ $K^{-1}$) The scattering signature 82 corresponds to a LZS glass ceramic ($\alpha=2.1\times10^{-6}$ $K^{-1}$) and the scattering signature 84 corresponds to ZERODUR® K20 ($\alpha=0.9\times10^{-6}$ $K^{-1}$). The optical key 22, 62 may thus in particular comprise a glass ceramic. The material of the optical key may in particular comprise LZS and/or ZERODUR® K20. Moreover, the material may in particular have a thermal expansion coefficient of $\alpha<2.5\times10^{-6}$ $K^{-1}$, preferably $\alpha<1.0\times10^{-6}$ $K^{-1}$.

Decorrelation of the speckle patterns are affected by changes in the optical path length. The optical path length, $S=L*n$, in a homogeneous medium is defined as the product of the geometrical length, L, with the refractive index, n. The thermal coefficient of the optical path is then:

$$\frac{1}{S}\frac{dS}{dT} = \frac{1}{Ln}\frac{d(Ln)}{dT} = \frac{1}{L}\frac{dL}{dT} + \frac{1}{n}\frac{dn}{dT} = \alpha + \tau_n$$

which may be an expression of a thermal reliability parameter of an optical key.

The decorrelation speed of the speckle pattern with temperature is expected to be proportional to $(1/S)(dS/dT)$. By denoting $(1/S)(dS/dT)=\beta$ and using $D=\alpha\Delta T$, one can write $(1/S)(dS/dD)=(\beta/\alpha)$. After integration: $S(D)=S(0)\exp(D\beta/\alpha)$ and $D\beta/\alpha=\ln(1+\Delta L/L)$, where $\Delta L=L(D)-L(0)$; $\Delta L/L \ll 1$. Thus, $D\beta/\alpha$ can be approximated as $\Delta L/L$; and $D=(\alpha/\beta L))\Delta L$. Therefore, decorrelation speed as a function of temperature depends on sample properties described by β (sum of linear thermal expansion coefficient and thermo-optic coefficient) and average light path length inside the sample, which is determined by sample properties such as mean free path as well as parameters of illumination. For example, L will be significantly larger in the transmission geometry in comparison with reflection geometry in the case of the same sample. Hence, for minimization of decorrelation speed a decrease of β as well as decrease average light path length inside the sample by adjusting experimental geometry is beneficial.

The optical key comprises in particular a material for which α is smaller than $5.0 \times 10^{-6}$ K$^{-1}$ and/or $\tau_n$ is smaller than $5.0 \times 10^{-6}$ K$^{-4}$. Preferably, the key comprises a material for which $\alpha + \tau_n$ is smaller than $5.0 \times 10^{-6}$ K$^{-1}$. This has the advantage that the scattering properties of the material are less dependent of temperature, i.e., exhibit a near-athermal scattering behavior. This means a wave front propagates undisturbed. However, manufacturing a material for which both α and $\tau_n$ become small is rather difficult.

The same invariance of the scattering properties can be achieved by matching the thermal expansion of a material to be opposite to that of the temperature coefficient of the refractive index, so that they compensate each other, which gives much more opportunity to make such materials. Thus, the optical key in particular comprises a material for which α and $\tau_n$ at least partially cancel each other. More preferably, the key comprises a material for which the absolute value $|\alpha + \tau_n|$ is smaller than $5.0 \times 10^{-6}$ K$^{-1}$.

In a strongly scattering medium, the situation is more complicated in that scattering signatures for at least two different phases, e.g., crystal(s) and residual glass, with different refractive indices are needed for proper characterization of the composite material. In general, the constituent phases have their individual thermal expansions and their individual thermal coefficients for the refractive indices. In such a situation, the weighted sum of the α and the $\tau_n$ of the materials can give an estimate of their combined effect, neglecting higher order corrections. Hence, the optical key in particular comprises a material for which $|A+T_n|$ is smaller than $5.0 \times 10^{-6}$ K$^{-1}$, where A is the weighted sum of the α of the phases of the material and T is the weighted sum of the $\tau_n$ of the phases.

Using scattering materials with close to zero thermal expansion and not too large $\tau_n$ values leads to small decorrelation as a function of temperature.

The advantage of these materials is that changes in temperature have considerably less effect on the speckle pattern of the scattering object, while when using normal materials, slight changes in temperature change the speckle pattern of the strongly scattering object, thereby also changing the scattering signature. In other word, by using a strongly scattering material with a near-athermal scattering signature, the optical key 22, 62 can be produced such that it can be used in a wide temperature range. Such athermal behavior is particularly beneficial for practical applications.

Using a strongly scattering, durable material with a small thermal expansion as a key for secure authentication offers the possibility of a robust and practical applicable authentication technique for numerous applications.

What is claimed is:

1. An apparatus for authenticating an optical key by verifying a match of a challenge-response pair, comprising:
   a challenge forming device that forms a challenge;
   an optical key comprising scattering material, the optical key is receptive to the challenge and provides a response to the challenge; and
   a response verifying device that is receptive to the response provided by the optical key, the response verifying device verifying if the response provided by the optical key matches the challenge,
   wherein the optical key is, when or after being exposed to an external influence comprising a physical or chemical stimulus, reliably authenticated, and
   wherein the physical or chemical stimulus is a mechanical stress or chemical contact.

2. The apparatus of claim 1, wherein the optical key is reliably authenticated at more than one temperature.

3. The apparatus of claim 1, wherein the optical key is reliably authenticated after exposure to touching or clothing or weather.

4. An apparatus for authenticating an optical key by verifying a match of a challenge-response pair, comprising:
   a challenge forming device that forms a challenge;
   an optical key comprising scattering material, the optical key is receptive to the challenge and provides a response to the challenge; and
   a response verifying device that is receptive to the response provided by the optical key, the response verifying device verifying if the response provided by the optical key matches the challenge,
   wherein the optical key is, when or after being exposed to an external influence comprising a physical or chemical stimulus, reliably authenticated, and
   wherein the optical key has a thermal reliability parameter lower than 1/(200,000 Kelvin), the thermal reliability parameter being an absolute value of one or more summed up temperature coefficients of the optical key.

5. The apparatus of claim 4, wherein the one or more summed up temperature coefficients of the optical key comprise a temperature coefficient of an optical path length (1/S)(dS/dT).

6. The apparatus of claim 4, wherein the one or more summed up temperature coefficients are selected from the group consisting of a temperature coefficient of a length of the optical key, a temperature coefficient of an area of the optical key, a temperature coefficient of a volume of the optical key, and a temperature coefficient of a refractive index of the optical key.

7. The apparatus of claim 4, wherein the optical key comprises at least two different materials and the thermal reliability parameter of each material is lower than 1/(100,000 Kelvin).

8. The apparatus of claim 1, wherein the optical key comprises a ceramic material with at least two different phases, wherein at least one of the two different phases defines a structure that determines the response of the optical key when receiving the challenge.

9. The apparatus of claim 8, wherein the ceramic material is a glass ceramic.

10. An apparatus for authenticating an optical key by verifying a match of a challenge-response pair, comprising:
   a challenge forming device that forms a challenge;
   an optical key comprising scattering material, the optical key is receptive to the challenge and provides a response to the challenge; and
   a response verifying device that is receptive to the response provided by the optical key, the response verifying device verifying if the response provided by the optical key matches the challenge,
   wherein the optical key is, when or after being exposed to an external influence comprising a physical or chemical stimulus, reliably authenticated, and
   wherein the optical key comprises a material selected from the group consisting of cordierite; silimanit; cristobalite; Mg—B quartz; mullit; eucryptite; $AB_2O_8$ where A is selected from the group consisting of Zr, Hf, Zn, Ti, U, TH, Lu, or mixtures thereof and B is selected from the group consisting of W, Mo, or mixtures thereof; $CD_2O_7$ where C is selected from the group of consisting of Zr, Hf, Zn, Ti, U, TH, Lu, Pu, Np, W, Ce, Sn, Ge, Si, or mixtures thereof and D is selected from the group of elements consisting of V,P, or mixtures thereof; $E_2F_3O_{12}$ where E is selected from the group of consisting of Sc, Y, Lu, Al, Ga, La, Lanthanoids, or mixtures thereof and F is selected from the group consisting of W, Mo, and P; and $GH_3$ where G is selected from the group consisting of Sc, Y, Ba, Mg, Ca, and Sr and H is selected from the group consisting of F, Cl, and mixtures thereof.

11. The apparatus according to claim 1, wherein the optical key comprises a material with a tuned scattering property.

12. The apparatus according to claim 11, wherein the tuned scattering property is a tuned scattering length of at least 1 and at most 10 micrometer.

13. The apparatus according to claim 11, whereat the optical key comprises a physical unclonable function that prevents manufacture of a replica of the optical key.

14. The apparatus of claim 1, further comprising a fixture for temporal fixation of the optical key when receiving the challenge formed by the challenge forming device.

15. The apparatus of claim 1, further comprising an interpolation device for interpolating between multiple responses of the optical key obtained at different temperatures.

16. A method for authenticating an optical key by verifying a match of a challenge-response pair, comprising:
   forming a challenge using a challenge forming device;
   providing a response to the challenge via an optical key receptive to the challenge; and
   verifying if the response provided by the optical key matches the challenge via a response verifying device that is receptive to the response provided by the optical key,
   wherein the optical key is, when or after being exposed to an external influence comprising a physical or chemical stimulus, reliably authenticated, and
   wherein the physical or chemical stimulus is a mechanical stress or chemical contact.

* * * * *